Dec. 21, 1926.

C. S. PREVITI 1,611,607

DIMMER FOR HEADLIGHTS

Filed Sept. 12, 1925

Inventor
Charles S. Previti

Lancaster and Allwine
Attorneys

Patented Dec. 21, 1926.

1,611,607

UNITED STATES PATENT OFFICE.

CHARLES S. PREVITI, OF EAST MORICHES, NEW YORK.

DIMMER FOR HEADLIGHTS.

Application filed September 12, 1925. Serial No. 56,019.

The present invention relates to circuit closers or switches, and more particularly to a device for use in dimming automobile headlights.

An object of the invention is to provide a novel type of switch which may be operated by the foot for dimming the headlights on vehicles as they approach one another so that the driver of a vehicle need not remove his hands from the steering wheel when passing another vehicle, and which may be used for reducing the glare of headlights which produce a great strain on the eyes and frequently blind the operator and prevent him from observing the road ahead and behind the oncoming headlights.

Another object of the invention is to provide a switch which may be mounted on the footboards or in any other convenient position on a motor vehicle and which is detachably connected to the lighting circuits so that the switch may remain on the footboards when the latter are removed for lubricating the running gear and other parts of the vehicle, and for the purpose of adjustment and repair.

Another object of the invention is to provide a switch which normally closes the lamp circuits to the full load of the battery, and which when operated throws in a suitable resistance into the lamp circuits for dimming the lamps. The switch is provided with a resistance of suitable capacity for dimming the headlights only partially without reducing the light to such extent as to prevent proper illumination of the roadway.

A further object of the invention is to provide a novel structure of casing and foot lever combined with the other parts of the device whereby the operating parts are relatively few and proper insulation is had to prevent accidental short circuiting should the switch be subject to rough treatment.

The above and various other objects and advantages of this invention will in part be understood from, and in part be described in the following detailed description of the present preferred embodiment, the same being illustrated in the accompanying drawing, wherein.

Figure 1:
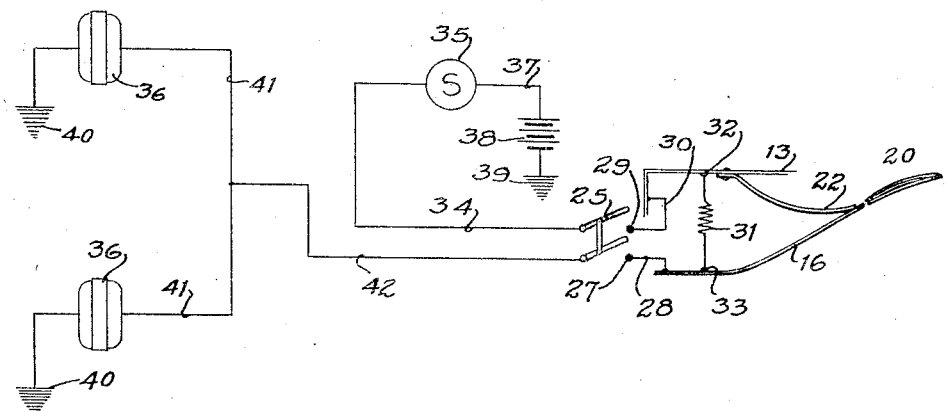
Fig. 1 is a diagrammatic view of the improved switch connected to the lighting circuit of a motor vehicle.

Referring to the drawing, the switch is provided with a base plate 10 adapted to be secured by screws 11 or the like to the foot board 12 of a motor vehicle, preferably within the range of the left foot of the operator. Riveted, or otherwise suitably secured to the base plate 10 is an elongated casing 13 which may be constructed of sheet metal or the like adapted to house the switch mechanism, and which has an outwardly and downwardly curved front wall 14 provided with a slot 15 near its upper end and which extends downwardly in the wall 14 to permit the rise and fall of a foot lever 16. The foot lever 16 is of substantial spring material and is secured and anchored at its inner end by rivets 17 or the like to an insulating plate 18 fitted in the bottom of the casing 13 preferably over an opening formed in the base plate 10.

Figure 2:
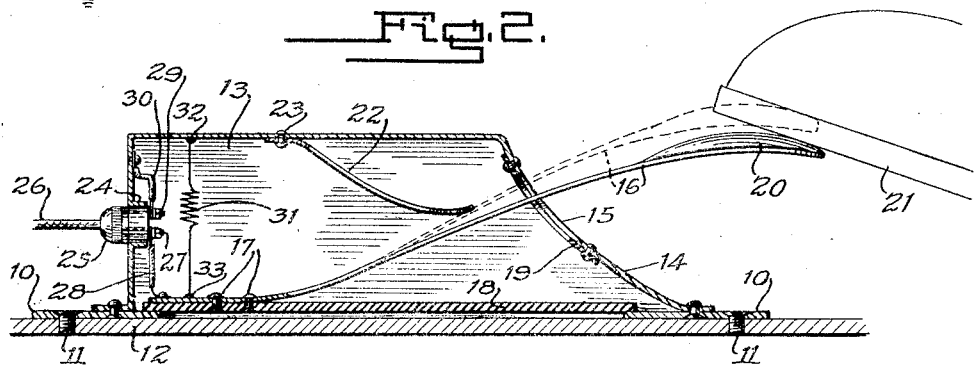
Fig. 2 is an enlarged vertical section taken longitudinally through a switch constructed according to the present invention, the dotted lines showing the switch in normal position and the full lines showing the switch in position to introduce the dimming resistance.
Figure 3:
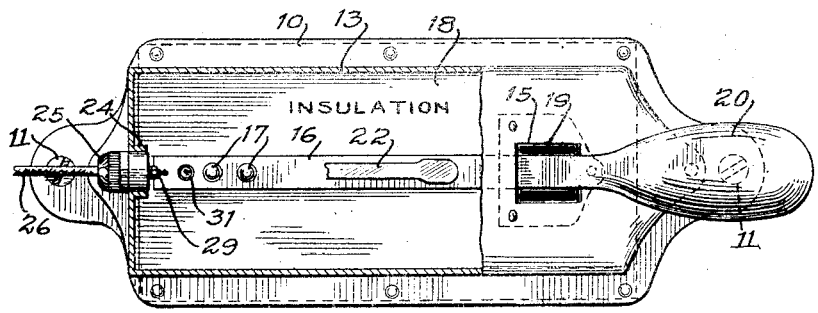
Fig. 3 is a top plan view of the switch, partly in section.

The foot lever 16 posseses sufficient inherent resiliency to maintain the outer end of the lever upwardly against the top of the slot 15. A slotted insulating plate 19 is secured against the inner side of the front wall 14 and has its slot of less dimensions than the slot 15 so as to engage the lever 16 and insulate it from the casing 13. The outer end of the lever 16 is upwardly bulged and rounded to provide a toe piece 20 adapted to receive the forepart of a shoe 21 thereupon for depressing the lever at the will of the operator. A spring contact 22 is secured at one end by a rivet 23 or the like to the top of the casing 13 and extends downwardly, and is rounded forwardly at its lower end to yieldingly and slidably engage the intermediate portion of the foot lever 16 when the latter is raised, as shown in Fig. 2.

The casing 13 is provided at its inner end with a plug socket 24 adapted to receive an electric plug 25 which is connected to an electric cord or cable 26 leading from the lighting system. The plug 25 has one terminal 27 connected by a wire 28 to the inner end of the foot lever 16, while the other terminal 29 of the plug is connected by a wire 30 or its equivalent to the casing 13 to include the same in the circuit.

The casing 13 carries therein a resistance coil 31 connected at one end 32 to the casing 13 and at its other end 33 to the inner end of the foot lever 16.

The electric cord 26 contains a wire 34 which leads to the switch 35 usually mounted on the instrument board of a motor vehicle for controlling the headlights 36. The switch 35 is also connected by a wire 37 to a battery 38 which is grounded at 39. The headlights 36 are grounded at 40 and are connected by branch wires 41 with a wire 42 which is carried to the switch or plug 25.

In operation, when the switch 35 is turned on to close the battery 38 in circuit with the headlights 36, the current passes through the casing 13, spring contact 22, foot lever 16 and through wire 28 back to the lighting circuit so that the headlights 36 may be turned on to their full brilliancy in usual manner. While the headlights 36 are thus lighted, if it is desired to momentarily dim the same, it is only necessary for the operator to depress the foot lever 16 sufficiently to break the circuit between the same and the spring contact 22. When this is done the current must pass from the casing 13 through the resistance coil 31 and the inner end only of the foot lever 16. This introduces the resistance 31 into the light circuit and dims the light proportionately to the amount of the resistance. Of course the resistance 31 may be of any desired capacity but it is preferred that the lamps 36 be dimmed to a sufficient extent only to prevent glare so that the roadway may still be illuminated.

It is of course understood that various changes and modifications may be made in the details of construction and design of the above specifically described embodiment of this invention, such changes and modifications being restricted only by the scope of the following claims.

What is claimed is:

1. A headlight dimmer comprising a metal casing, a yieldable contact mounted in the casing, an insulating plate mounted in the casing, said casing having an opening in one end thereof, a second yieldable contact lever mounted on the insulating plate and extending outwardly through the opening in the casing, and a resistance in the casing, one end of said resistance being secured to the casing, and the other end of the resistance being secured to the inner end of said second lever.

2. A headlight dimmer comprising a casing, a yieldable contact mounted in the casing, said casing having a slot opening in one end thereof, an insulating plate mounted in the casing, a yieldable operating lever secured at its inner end to said insulating plate and extending at its outer end through the slot, said operating lever normally engaging one end of said yieldable contact, a resistance secured at opposite ends to said yieldable contact and said lever, and a socket mounted in the casing, said socket being adapted to receive a plug for connection to one side of a lighting circuit.

3. A headlight dimmer comprising a metallic casing, a pair of yieldable contacts in said casing normally engaging one another, one of said contacts extending thru one end of said casing and insulated therefrom, and the other contact in electrical conducting communication with said casing, and a resistance in said casing connecting said contacts.

CHARLES S. PREVITI.